United States Patent [19]

Hanson

[11] Patent Number: 5,597,892
[45] Date of Patent: Jan. 28, 1997

[54] PROCESS FOR SEPARATING DILUENTS FROM SOLID POLYMERS UTILIZING A TWO-STAGE FLASH AND A CYCLONE SEPARATOR

[75] Inventor: Donald O. Hanson, Bartlesville, Okla.

[73] Assignee: Phillips Petroleum Company, Bartlesville, Okla.

[21] Appl. No.: 467,503

[22] Filed: Jun. 6, 1995

Related U.S. Application Data

[62] Division of Ser. No. 663,515, Mar. 4, 1991.

[51] Int. Cl.$^6$ ............................................. C08F 6/24
[52] U.S. Cl. ............................................. 528/501; 528/503
[58] Field of Search ............................................. 528/501, 503

[56] References Cited

U.S. PATENT DOCUMENTS

| | | | |
|---|---|---|---|
| 2,943,082 | 6/1960 | Cottle | 260/93.7 |
| 3,280,091 | 10/1966 | Daance | 260/93.7 |
| 3,418,305 | 12/1968 | Payne et al. | 260/94.9 |
| 3,639,374 | 2/1972 | Stryker, Jr. | 260/93.7 |
| 3,816,383 | 6/1974 | Stotko | 260/94.9 |
| 4,191,821 | 3/1980 | Gloriod | 528/501 |
| 4,424,341 | 1/1984 | Hanson et al. | 528/501 |
| 5,183,866 | 2/1993 | Hottovy | 528/501 |

*Primary Examiner*—Thomas R. Weber
*Attorney, Agent, or Firm*—Ryan N. Cross

[57] ABSTRACT

A method are provided for separating diluents from solid polymers in an effluent extracted from a polymerization reactor. The separation utilizes a two-stage flash involving a first intermediate pressure flash and a second lower pressure flash, with the first intermediate pressure flash occurring in a cyclone vessel having an extended solids reservoir.

10 Claims, 2 Drawing Sheets

5,597,892

PROCESS FOR SEPARATING DILUENTS FROM SOLID POLYMERS UTILIZING A TWO-STAGE FLASH AND A CYCLONE SEPARATOR

This application is a division of application Ser. No. 07/663,515 filed Mar. 4, 1991.

The present invention relates to a method and apparatus for separating solid polymer and liquid diluent from a mixture of those materials.

In many polymerization processes for the production of normally solid polymers such as polyethylene and polypropylene, an effluent stream is formed which is a slurry of particulate polymer solids suspended in a liquid medium. The reaction diluent is often an inert hydrocarbon solvent that may also be the monomer used to form the polymer. Where the diluent is the monomer, the polymerization reactor effluent will contain a substantial quantity of unreacted monomer. An example of such a process and numerous advantages to using the monomer as the diluent are disclosed in U.S. Pat. No. 3,002,961. For economical operation of such processes, this diluent must be recovered, preferably free from contamination, so that it can be recycled to the polymerization reactor with minimal, if any, purification. Processes for the recovery and recycling of the diluent have been disclosed in U.S. Pat. Nos. 3,639,374 and 4,424,341. Such processes are generally either one-stage flash processes with a low pressure recovery of the diluent after the flashing or a two-stage flash process with recovery of most of the diluent between the two flashes while the diluent is still at a sufficient pressure to avoid needing recompression.

In a one-stage flash process, a slurry of polymer and diluent is collected in one or more settling legs of the polymerization reactor. Next, the slurry is discharged to a flash vessel wherein the mixture is flashed to a low pressure such as about 20 psia. While the flashing results in substantially complete removal of the diluent from the polymer, it is necessary to recompress the vaporized diluent in order to be able to condense it to a liquid suitable for recycling to the polymerization reactor. The cost of compression and the utilities for its operation often amounts to a significant portion of the expense involved in producing the polymer.

In a two-stage flash process, the slurry is typically heated after being collected in one or more settling legs. The diluent in the heated slurry is vaporized by exposing the heated slurry to a pressure drop in a first flash step. The pressure and temperature of the heated slurry in the first flash step are such that a major amount of the diluent will be vaporized and this vapor can be condensed without compression by heat exchange. The polymer solids from the first flash step are then subjected to a lower pressure flash step to vaporize any additional remaining diluent. This process often requires utilizing equipment within the first flash vessel to maintain a fluidized bed of the polymer solids in the chamber. In addition, continuous removal of the solid polymer in the first flash chamber is required. This removal necessitates using some means for controlling the flow from the first flash chamber to the second flash chamber which will isolate the higher pressure flash vessel from the lower pressure flash vessel.

It is, therefore, an object of the present invention to provide a method and apparatus for separating the solid polymer and the diluent in a manner that reduces the need for compression of the diluent.

It is another object to provide a method and apparatus for separating the solid polymer and the diluent in a manner that reduces the need for a fluidized bed.

It is still a further object to provide a method and apparatus for separating the solid polymer and the diluent in a manner which does not require continual isolation of the higher pressure flash vessel from the lower pressure flash vessel In accordance with the present invention, there is provided a method and apparatus for recovering polymer solids from a polymerization zone effluent comprised of a slurry of the polymer solids in a liquid diluent.

The above objects are realized in a method which comprises: vaporizing the diluent by exposing the effluent to a pressure drop, at least partially, in a first flash zone of a cyclone type with an extended solids receiving zone; separating the diluent vapor from the effluent in the first flash zone; removing the diluent vapor from the first flash zone; condensing the diluent vapor; recycling at least part of the condensed diluent to the polymerization zone; allowing the polymer solids to pass into the extended solids receiving zone where they are held until it is at least partially full, thereafter, passing the polymer solids from the extended solids receiving zone to a second flash zone where they are exposed to a second pressure drop which vaporizes residual diluent remaining with the polymer solids; and separating the residual diluent vapor from the polymer solids.

In another aspect of the invention, there is provided an apparatus which comprises: a polymerization reactor; a first flash vessel in the form of a cyclone with an extended solids reservoir; means for transferring the effluent from the polymerization reactor to the first flash vessel so that when the effluent is transferred to the first flash vessel, a major portion of said diluent is vaporized and the polymer solids settle in the extended solids reservoir; means for removing the diluent vapor from the first flash vessel; means for condensing the diluent vapors without compression by heat exchange; means for recycling at least part of the produced condensed diluent to the polymerization reactor; a second flash vessel; means of passing the polymer solids from the extended solids reservoir to the second flash vessel such that the polymer solids are retained in the extended reservoir until the reservoir is at least partially full at which time the polymer solids are passed to the second flash vessel where they undergo a second pressure drop causing residual diluent remaining with the polymer solids to vaporize.

In the drawings, forming a part hereof, like reference characters denote like parts.

Figure 1:
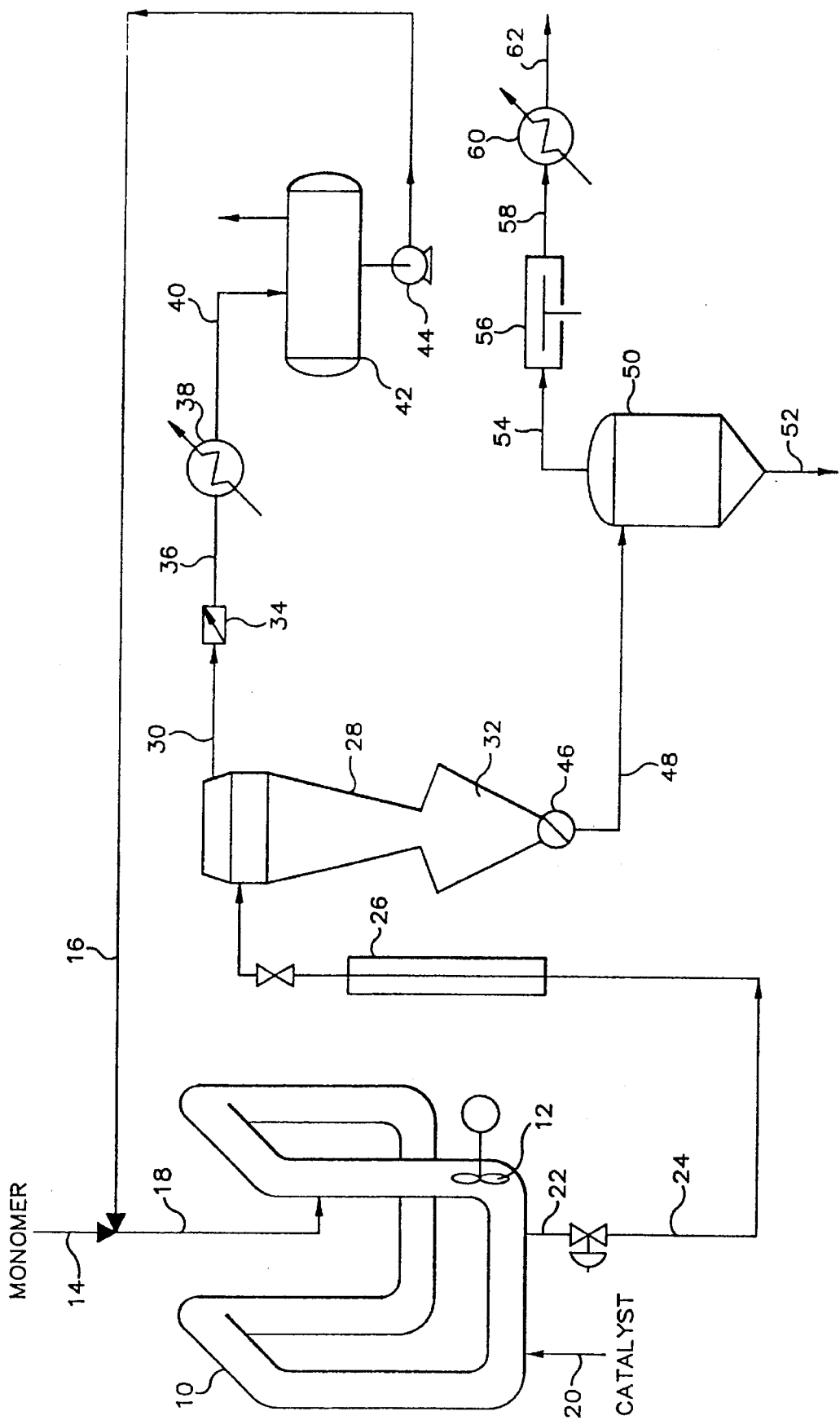
FIG. 1 is a schematic representation of a process for separating polymer from diluent in accordance with the present invention.

In the embodiment illustrated in FIG. 1, the polymerization is carried out in loop reactor 10. The polymerization mixture is circulated by agitator 12 disposed within reactor 10. Monomer is introduced into reactor 10 through conduits 14 and 16 connected to conduit 18 which is connected in fluid flow communication with reactor 10. Catalyst is added to reactor 10 through conduit 20 which is connected in fluid flow communication with reactor 10. Polymer effluent is removed from loop reactor 10 to a settling leg 22 which is connected in fluid flow communication with reactor 10.

The effluent passes from settling leg 22 to conduit 24 and into cyclone flash vessel 28. Conduit 24, which is in fluid flow communication with settling leg 22 and flash vessel 38, can have an indirect heat exchange means such as flash line heater 26. Flash vessel 28 is in the form of a cyclone having an extended solids reservoir 32. Vaporized diluent exits the flash vessel 28 via conduit 30 which is in fluid flow communication with flash vessel 28. A check valve 34 prevents reversal of the flow in conduit 30 back into the cyclone flash chamber 28. The vapor flows via conduit 36 from the check valve 34 to heat exchanger 38 wherein the vapor is condensed by indirect heat exchange with a heat exchange fluid. The condensed diluent then flows to an accumulator 42 via conduit 40. Any uncondensed vapors and gases can be removed overhead from the accumulator 42. A pump 44 is provided for conveying the condensed diluent back to polymerization reactor 10 via conduit 16.

The polymer solids settle in the extended solids reservoir 32 of flash vessel 28. When the extended solids reservoir 32 is at least partially filled, preferably substantially filled, typically more than 80 percent filled, the contents flow via conduit 48 into the lower pressure flash vessel 50. Passage of the polymer solids from the extended solids reservoir 32 into conduit 48 is controlled by valve 46 which is fully open when the polymer solids are flowing to lower pressure flash vessel 50 and fully closed at other times. The polymer solids in lower pressure flash vessel 50 flow via line 52 to a conventional dryer (not shown) from which the polymer can be packaged or otherwise handled while in contact with the atmosphere. The vapors exit flash chamber 50 via conduit 54. The vapor then flows to a compressor 56 and the compressed vapors flow through conduit 58 to a condenser 60. The condenser 60 condenses the vapor to the liquid phase and the liquid diluent will be recycled through conduit 62 to conduit 16 and then to polymerization reactor 10.

In the following description of the operation of the system for separating polymer from diluent, some steps and operating conditions such as pressures, etc., will be given. It should be understood that these steps and conditions are typical of separation systems and are given for the sake of illustration and the invention is not limited thereby.

The polymerization reactor effluent is comprised of a slurry of polymer solids in a liquid diluent. While the present invention is applicable to any mixture which comprises a slurry of polymer solid and diluent, it is particularly applicable to the slurries resulting from olefin polymerizations. The olefin monomers generally employed in such reactions are 1-olefins having up to 8 carbon atoms per molecule and no branching nearer the double bond than the 4-position. Typical examples include ethylene, propylene, butene-1, 1-pentene, and 1,3-butadiene. The diluent may be the monomer from which the polymer was formed or it may be an inert hydrocarbon solvent. Typical diluents employed in such olefin polymerizations include hydrocarbons having 3 to 12, preferably 3 to 8 carbon atoms per molecule, such as propane, propylene, n-butane, n-pentane, isopentane, n-hexane, toluene, isooctane, isobutane, 1-butene, and the like. In some cases, naphthene hydrocarbons having 3 to 6 carbon atoms in the naphthene ring are also used. Examples of such naphthenic hydrocarbons include cyclohexane, cyclopentane, methylcyclopentane, ethylcyclohexane, and the like.

It is preferable that the diluent be the monomer from which the polymer is formed in the loop reactor. It is also preferable that the effluent contain approximately 60% polymer solids, and approximately 40% monomer.

As noted previously, polymerization effluent flows from settling leg 22 to conduit 24 and into cyclone flash vessel 28. While the effluent flows through conduit 24 it can be heated by flash line heater 26. The temperature to which the slurry is heated for vaporization will vary, of course, depending upon the nature of the diluent, the nature of the polymer, and the temperature of the heat exchange fluid that is used to condense the vaporized diluent. Clearly, the temperature must be raised above the dew point of the diluent at the flashing pressure if it is not already above the dew point.

Further, the temperature should be below that of the melting point of the polymer to preclude accumulation of polymer in the process vessels and to preclude agglomeration of the polymer particles.

The heated effluent is exposed to a pressure drop within flash vessel 28 and can also be exposed to a pressure drop in conduit 24. The pressure drop, along with any heating by flash line heater 26, is such that a major portion of diluent will be vaporized. Vaporization can occur at least partially within conduit 24. The pressure of the cyclonic flash vessel will vary depending upon the nature of the diluent and the temperature selected. Typically, pressures in the range of about 100 to about 300 psia can be employed; preferably, 200 to 250 psia. In contrast, lower pressure flash vessel 50 typically has a pressure in the range of 5 psia to 75 psia.

In addition to the pressure drop, the polymerization effluent undergoes cyclonic action due to the cyclone shape of flash vessel 28. Thus, the cyclone shaped flash vessel, alone or in combination with conduit 24, defines a first flash zone. This cyclonic action facilitates the separation of diluent and polymer solids effectuated by the vaporization of diluent. Thus, in flash vessel 28, the major portion of the diluent associated with the polymer solids as they leave settling leg 22 is removed as vapor via conduit 30 and subsequently condensed without compression by heat exchange with a heat exchange fluid in heat exchanger 38. The heat exchange fluid will typically have a temperature in the range of about 40° F. to 130° F.

Furthermore, the use of a cyclone with an extended solids reservoir alleviates the need to continuously isolate the pressure of the cyclone flash vessel 28 from the low pressure of flash vessel 50. No continuous isolation is needed because the present invention does not require the continuous removal of polymer solids from a first flash vessel to a second flash vessel. Instead, the present invention allows a batch of polymer solvents to collect in extended solids reservoir 32 and then substantially all the batch is passed to lower pressure flash vessel 50. Thus, the two flash vessels require only a pressure isolation during the collection of the polymer solids and not when they are being passed.

Figure 2:
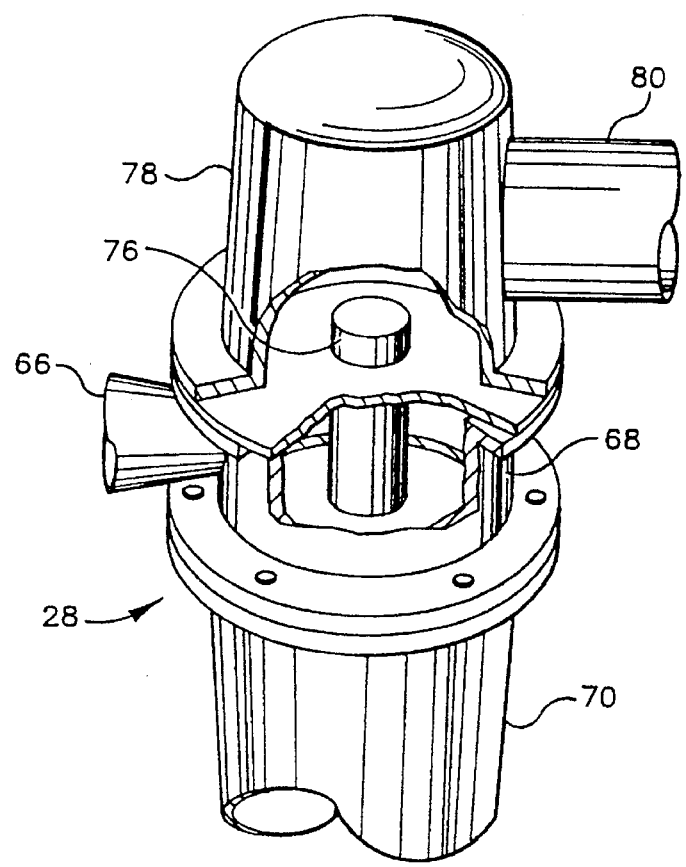
FIG. 2 is a schematic diagram of a cyclone flash vessel.
Figure 2:
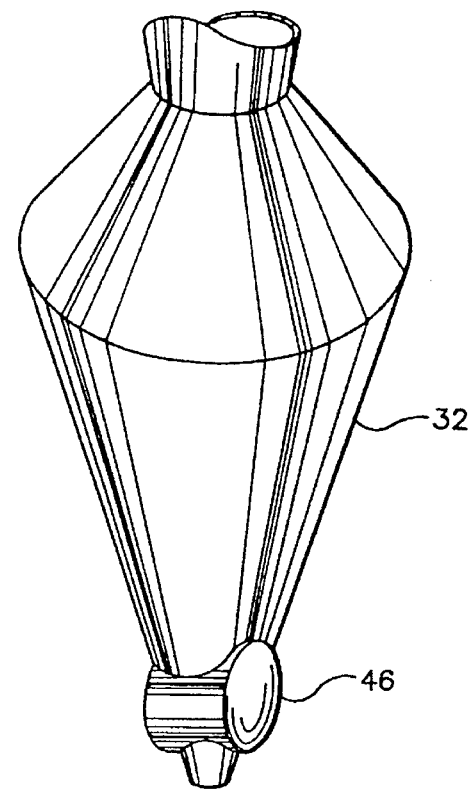

FIG. 2 illustrates a cyclone flash vessel. The feed, i.e., polymerization effluent, enters cyclone flash vessel 28 tangentially through feed inlet 66, which is in fluid flow communication with conduit 24 of FIG. 1. From feed inlet 66, the feed enters short cylindrical section 68 and is passed from section 68 to cone-shaped section 70. In section 70, vaporization separation is facilitated by cyclonic action with the heavier portion of the feed, i.e., polymer solids, passing into solids reservoir 32. Valve 46, when open, allows the heavier portions of the feed to pass out of cyclone flash vessel 28 and, when closed, allows the heavier portion of the feed to collect in solids reservoir 32. The lighter portion of the feed, i.e., diluent, is carried by central vortex finder 76 into upper chamber 78 and from there the lighter portion leaves through overflow top orifice 80, which is in fluid flow communication with conduit 30 of FIG. 1. Additionally, central vortex finder 76 which is contained in section 68 prevents short circuiting within the cyclone.

While this invention has been described in detail for the purpose of illustration, it is not to be construed to be limited thereby, but is intended to cover all changes and modifications within the spirit and scope thereof.

That which is claimed is:

1. A method of recovering polymer solids from a polymerization effluent extracted from a polymerization zone at a first temperature and a first pressure, said effluent comprising a slurry of said polymer solids in a liquid diluent, comprising the steps of:

(a) exposing said effluent to a pressure and temperature drop from said first pressure to a second pressure and from said first temperature to a second temperature, at least partially, in a first flash zone having the form of a cyclone with an extended solids receiving zone sufficient to allow an amount of polymer solids to collect in said extended solids receiving zone, so that a major portion of said diluent is vaporized to produce diluent vapor;

(b) separating said diluent vapor from said effluent in said first flash zone by means of said pressure and temperature drop and by means of cyclonic action induced by the cyclonic shape of said first flash vessel;

(c) removing said diluent vapor from said first flash zone;

(d) condensing said diluent vapor without compression by heat exchange to produce condensed diluent;

(e) recycling at least part of said thus produced condensed diluent to said polymerization zone;

(f) passing said polymer solids into said extended solids receiving zone;

(g) holding said polymer solids in said extended solids receiving zone until said extended solids receiving zone is at least partially full; and (h) thereafter passing said polymer solids from said extended solids receiving zone into a second flash zone at a third pressure lower than said second pressure wherein residual diluent remaining with said polymer solids is vaporized to residual diluent vapor.

2. The method of claim 1, wherein after said effluent is extracted from said polymerization zone, said effluent is heated to a temperature higher than said first temperature.

3. The method of claim 1, wherein said removing of said diluent vapor in step (c) occurs as said thus produced diluent vapor is separated from said effluent.

4. The method of claim 1, in which said diluent comprises a monomer used to form said polymer solids.

5. The method of claim 4, in which said effluent comprises about 60 percent of said polymer solids and about 40 percent of said diluent.

6. The method of claim 1, in which said polymer solids are formed from at least one olefin monomer from the class consisting of 1-olefins having up to 8 carbon atoms per molecule and no branching nearer the double bond than the 4-position.

7. The method of claim 6, in which said diluent comprises said at least one olefin monomer used to form said polymer solids.

8. The method of claim 7, in which said effluent comprises about 60 percent of said polymer solids and about 40 percent of said at least one olefin monomer.

9. The method of claim 6, in which said at least one olefin monomer is selected from the class consisting of ethylene, propylene, and a mixture thereof.

10. The method of claim 9, in which:

said diluent comprises said at least one olefin monomer used to form said polymer solids;

said effluent comprises about 60 percent of said polymer solids and about 40 percent of said at least one olefin monomer;

after said effluent is extracted from said polymerization zone, said effluent is heated to a temperature higher than said first temperature; and said removing of said diluent vapor in step (c) occurs as said diluent vapor is separated from said effluent.

* * * * *